June 28, 1960 T. C. MACNAMARA ET AL 2,943,241
LIGHTING ARRANGEMENTS
Filed May 26, 1958 3 Sheets-Sheet 1
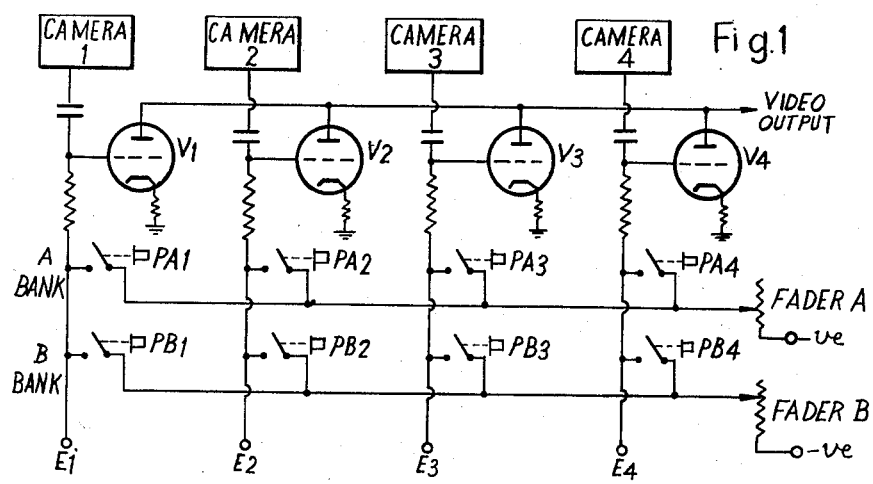
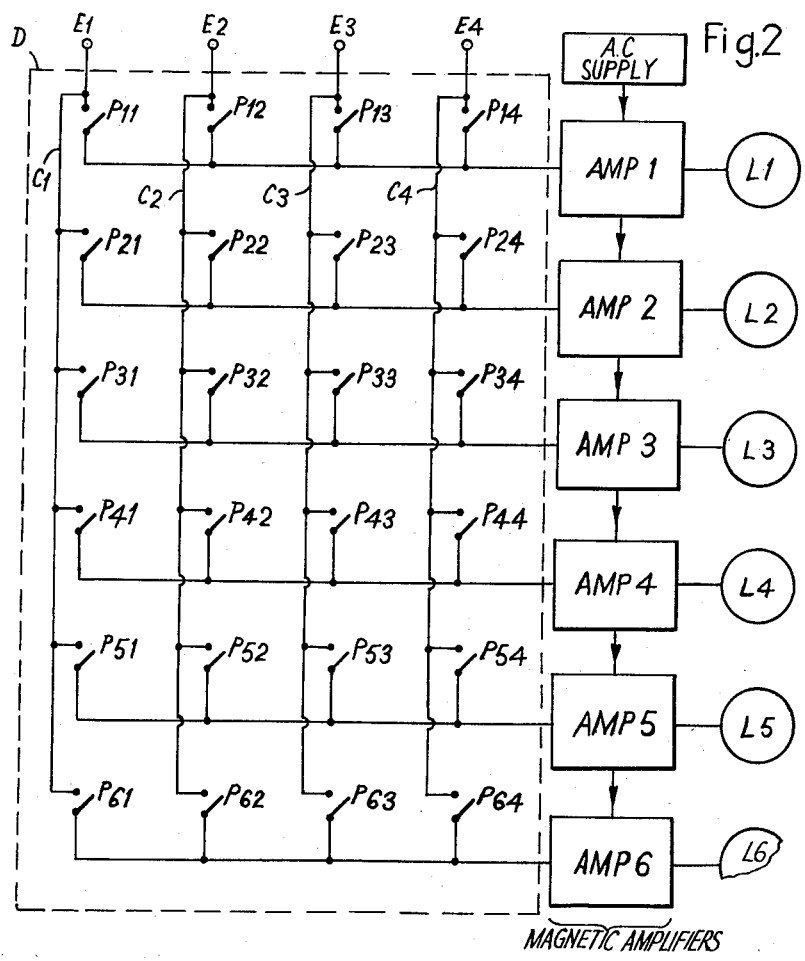

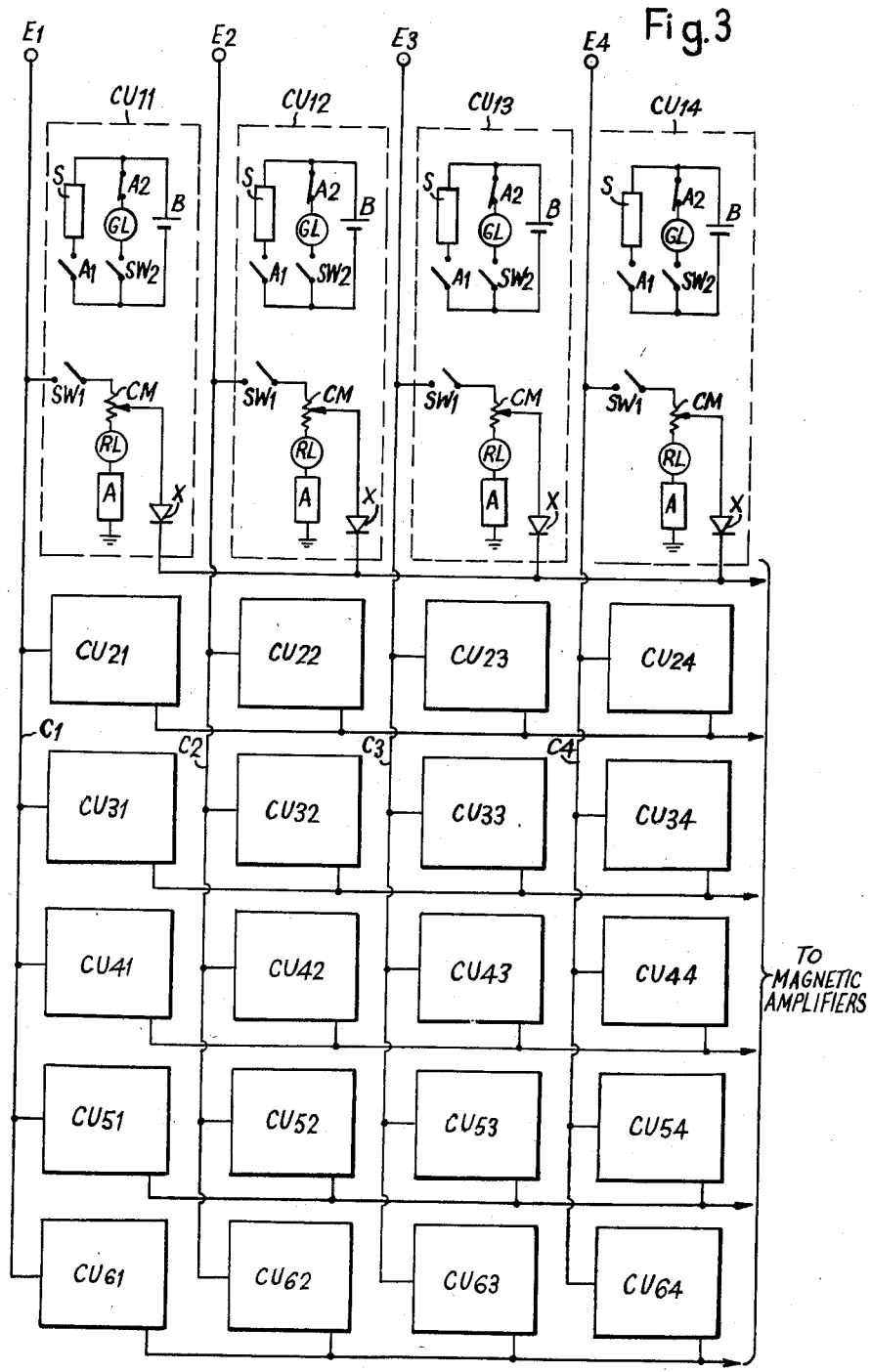

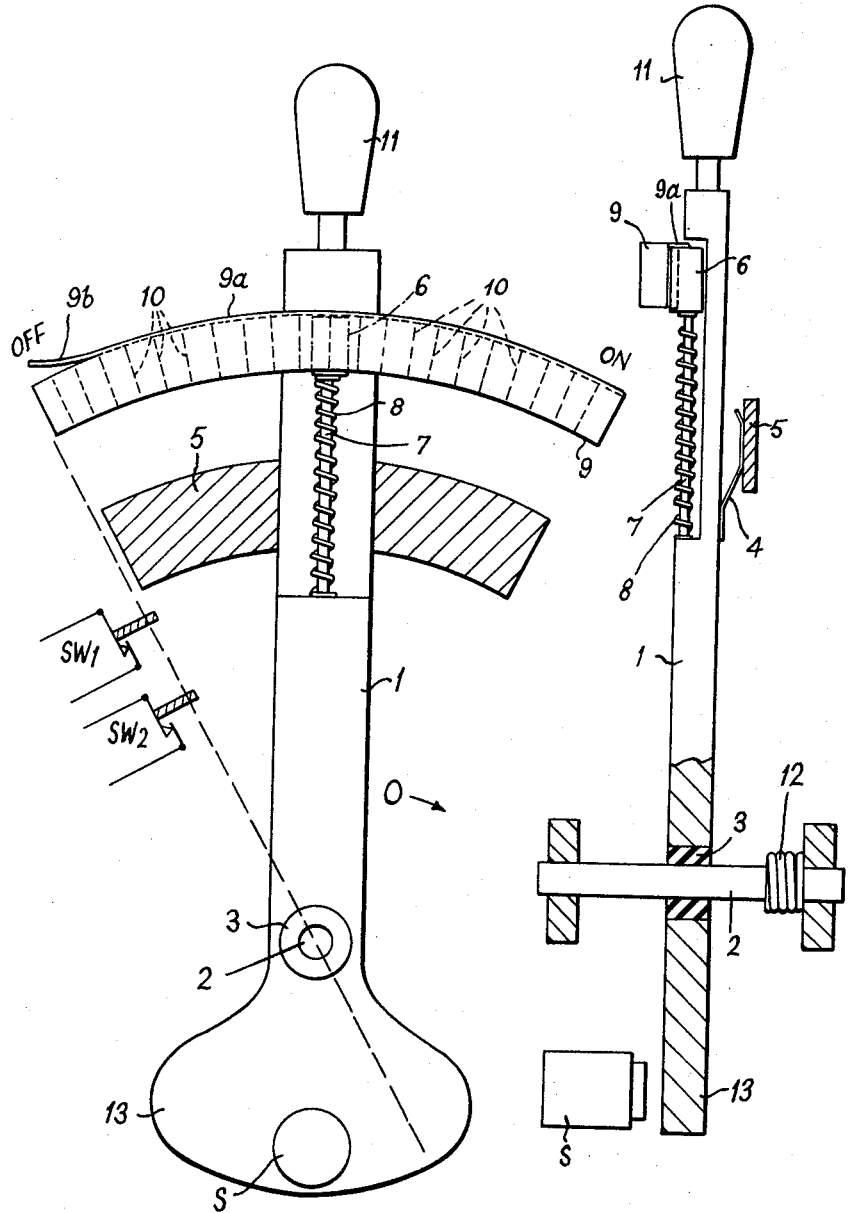

United States Patent Office 2,943,241
Patented June 28, 1960

2,943,241

LIGHTING ARRANGEMENTS

Terence Cameron Macnamara and Stanley Robert Phillips, London, and John Rook, Middlesex, England, assignors to Associated Television Limited, London, England, a British company Filed May 26, 1958, Ser. No. 737,920

Claims priority, application Great Britain May 29, 1957

14 Claims. (Cl. 315—316)

The present invention relates to lighting arrangements, particularly for use in conjunction with television cameras and motion picture film cameras.

The lighting arrangements at present employed at a studio or other location for illuminating a person, object or scene (hereinafter simply referred to as a "scene") to be televised or filmed are usually a compromise in order to achieve the best overall lighting effect from all angles at which a picture may be taken, whilst allowing freedom of movement of equipment and ability to change the position of the camera or cameras. This is necessitated particularly in the production of television programmes where there is usually insufficient time or space to re-arrange the lighting equipment to produce the ideal or optimum lighting effect for each picture at each camera position; and also in the production of motion picture films where several cameras are located at different positions to view a scene and may operate simultaneously or as selected to produce film pictures of that scene from different angles.

It is an object of the present invention to provide means whereby improved lighting arrangements can be obtained for persons, objects and scenes to be televised or filmed.

It is a further object of the invention to provide lighting arrangements which can be operated in synchronism with the operation of other equipment or apparatus.

According to the present invention, means are provided for producing at least two different lighting effects, in combination with at least two cameras arranged to view a scene each lighting effect being capable of illuminating the scene, means for selecting an output from any one of the cameras and means for bringing any chosen one of the lighting effects into operation as the output from a particular camera is selected.

The invention also provides apparatus comprising a plurality of cameras, means for selecting a desired output from amongst the outputs of said cameras, means for producing a plurality of different lighting effects, and means for selectively bringing any of the chosen lighting effects into operation as the output from a particular camera is selected.

The different lighting effects may each consist of one or more different light sources or may be produced by a combination of light sources which are switched into operation when an output is taken from a camera with which they are associated. It will be appreciated that some of the light sources may form a part of more than one lighting effect. Generally the lighting sources produce visible light of different intensities, colours and types to produce the desired effect, but it is to be understood that the lighting sources may also produce invisible light such as ultra-violet light or infra-red light for use where special effects are to be produced for example, in the production of composite pictures.

According to a feature of the invention as applied to television applications, a vision mixer is employed to control and select the outputs from the various cameras which also includes means for controlling the lighting effects, so that when the controls of the vision mixer are operated to select the output from a chosen camera the lighting effect associated with that camera is automatically brought into operation. The controls for the lighting sources may be directly switched into and out of operation with the switching of the output of the associated television camera or cameras or, alternatively or additionally, the lighting sources may be gradually brought into and faded out of operation by means of controls ganged with faders which are arranged to fade in and out signals from the various television cameras. The faders may be video faders, usually of 75 ohms controlling the actual video signal outputs from the cameras, or D.C. faders which control the D.C. bias on an amplifier through which the video signals from the cameras are passed. Where D.C. faders are employed in the television mixer to provide a D.C. bias controlling the gain of an amplifier through which the video signals from the output of a selected camera are passed; the D.C. bias variations which vary the camera signals are also employed to operate a control member controlling the current applied to the associated lighting sources.

As applied to the production of motion picture films by the use of several cameras, the operation of which is electrically or electronically controlled from a central control position, the D.C. potentials for operating the members controlling the lighting sources may be derived from the control potentials applied to operate the different cameras. The control member may comprise a magnetic amplifier or saturable reactor, which can incorporate positive or negative feedback, an electric or gas filled relay or any other appropriate device such as an ignitron. With such an arrangement, not only is it possible to select the appropriate lighting effects instantaneously upon the operation of a switch also controlling the selection of the camera output, but a fading or dissolving from one camera to another also controls the gradual variations of the lighting effects on the two pictures produced by the two cameras involved.

According to yet a further feature of the invention, instead of the lighting source or sources producing a particular lighting effect being extinguished when they are not in use, the lamps are not extinguished completely but are pre-set at a low burning voltage which produces negligible light output, but which enables them to reach full intensity in a much shorter time than if they were switched on from the cold condition. Such an arrangement may be advantageously employed in combination with television cameras which may have a characteristic in which the output falls off rapidly below a certain intensity of illumination. Such camera tubes will therefore not respond to the negligible light output produced by lighting units not actually at full intensity at a given time.

According to a further feature of the invention the lighting sources may be actuated to give a number of different lighting effects required throughout a film sequence or television or other programme, by setting up the necessary sequence of operation of the control member or switches as information stored by a memory system consisting for example of a punched tape, a magnetic tape, or a rotary selector switch, whereby successive changes of the cameras which are pre-determined during the rehearsal of a programme can be automatically effected in synchronism with the lighting changes required. Preferably an over-riding manual control is also provided which allows such a preplanned camera sequence to be altered during the course of an actual television programme or an actual filming if desired.

Furthermore solenoid operated shutters may be provided on the lighting sources to permit instantaneous lighting effects with camera cuts. The solenoids may be operated by the D.C. control potentials which control the lighting sources.

In order that the invention may be more fully understood reference will now be made to the accompanying drawings, which illustrate the invention as applied to the production of television programmes, and in which:

Figure 1 is the basic circuit diagram of one type of vision mixing equipment which may be employed in an arrangement according to the invention for controlling the lighting in a television studio, Figure 2 is a circuit diagram of one embodiment of a lighting arrangement according to this invention, Figure 3 is a circuit diagram of a further embodiment according to the invention, and Figures 4a and 4b show respectively a side elevation and an end elevation of a fader device which is employed in the circuit of Figure 3.

Referring to Figure 1, the vision mixing equipment consists of four mixing valves V1, V2, V3 and V4 whose grids are respectively fed from the television cameras 1, 2, 3 and 4 and which have a common anode output circuit from which the desired video output is derived. The selection and control of the camera signals fed to the output is effected by means of two banks of press-button switches A and B, each bank consisting of four switches, PA1–PA4 and PB1–PB4 respectively; and each bank being associated with a D.C. fader which operates to vary the negative D.C. bias applied to the grid of whichever valve is connected to the fader through the appropriate switch. It will be understood that when any of the valves are not connected to a fader, they are maintained cut off by means of an appropriate negative bias fed to the control grid of each valve through other switch contacts (not shown), these switch contacts opening to disconnect this bias when a valve is connected to the fader. The press button switches in each row are interlocked so that the pressing of any one button in row A to close a switch will release any other button which has previously been pressed in the same row and so open its associated switch; and similarly for row B. The negative bias voltage which can be fed to the valves V1–V4 through the faders exceeds that which is required to cut off the valves, and a video signal on the grid of any of the valves will only appear in the anode circuit if the appropriate button is pressed to close the switch to connect one of the faders to the valve, and the fader is moved to a position where the bias applied to the valve is decreased to a value to allow the valve to conduct. Thus if it is desired to control the output from camera 1 with fader A then button PA1 will be pressed to close the corresponding switch and a decrease in the negative bias applied through fader A will produce the signal from camera 1 in the video output circuit, the amplitude of the signal increasing as the bias decreases. Similarly if it is desired to control camera 3 with fader B, then button PB3 will be pressed to close the corresponding switch, and the amplitude of the video output is a function of the fader setting. Such an arrangement is known in the art and provides facilities for cutting from one camera to another, as desired, provided that the faders are both in a position to allow sufficient signal to pass through the associated valves, and also for mixing the signals from any two cameras in order to fade one signal in as the other signal is faded out, by appropriate arrangement and adjustment of the faders A and B.

It will be seen that the D.C. bias potential applied to the grids of any of valves V1 to V4 through the faders A and B and the switches bear a direct relationship to the amount of signal which is fed to the output from any one camera, and this bias voltage is employed via terminals E1 to E4 to control lighting effects associated with the different cameras.

One arrangement by which this may be achieved is shown in Figure 2 where the negative D.C. bias voltages applied to control the valves are also fed through terminals E1 to E4 on to four conductors C1 to C4 each of which can feed six push-button switches; the six switches associated with each conductor being capable of connecting that conductor to control any of six lighting sources L1 to L6. The D.C. bias is employed to control magnetic amplifiers 1 to 6 which respectively in turn control the A.C. supply to the lamps. The magnetic amplifiers may include positive or negative feedback as desired. It will thus be seen that switches P11 to P14 respectively serve to connect conductors C1 to C4 to magnetic amplifier 1 which controls lamp 1, and that the successive series of switches P21–P24, P31–P34, P41–P44, P51–P54 and P61–P64 serve to connect the lamps L2 to L6 and their controlling magnetic amplifiers to conductors C1 to C4.

Thus if it is desired that when camera 1 (Figure 1) is producing an output controlled by a fader i.e. either fader A or B, then lamps L2 and L5 shall be in operation to give the desired lighting effect, push-button switches P21, P51 are closed. In this way, when the negative bias applied to the grid of valve V1 is varied, this voltage is also applied through terminal E1, conductor C1 and the switches P21 and P51 to control magnetic amplifiers 2 and 5 to pass A.C. current to bring lamps L2 and L5 into operation at the same time as the output is fed from camera 1. Similarly if it is desired to employ lamps L1 and L4 with the output from camera 3 selected by either fader A or B, then push buttons P13 and P43 would be operated. The foregoing examples of certain lamps being used with certain cameras are of course given solely by way of illustration only. Where it is desired to produce a rapid cut from one camera to another the faders are in the position where they apply minimum bias to the valves whereby a maximum amplitude video output is obtained and similarly the negative potential applied to control the magnetic amplifiers is then at minimum so that the A.C. supply to the lights can be quickly switched on or off or brought to the desired brilliance. On the other hand where the signal from one camera is to be gradually faded in as the signal from another camera is faded out, the bias potentials applied to the magnetic amplifiers controlling the A.C. supply for selected lights for the different cameras is such that the appropriate lights are increased in intensity as one picture is faded in and decreased in intensity for the picture which is being faded out. It will be understood that the D.C. bias sources connnected to faders A and B (Figure 1) can supply sufficient current to control the magnetic amplifiers. It will also be appreciated that any other type of switches besides push-button switches may be employed.

The switching arrangement shown in Figure 2 is under the control of a lighting operator, who operates the appropriate switches to provide the desired lighting effects for any particular programme according to a predetermined sequence. The lighting operator can thus preset the switches for a sequence of lighting effects during a programme so that it is always set up before any desired shot is taken by any camera, the actual illumination of the scene by the required lighting at the desired time being controlled by the vision mixer operator automatically upon bringing the camera taking that shot into operation.

If desired, each of the push-buttons PA1–PA4 and PB1–PB4 may be associated with additional switch contacts which enable separate control voltages to be derived from the output by the operation of each of faders A and B with each camera. By this means, in combination with additional switches on the lighting selection board of Figure 2, so that the separate control voltages are fed to two different switches for the control of each lamp, it is possible to increase the number of switches which can be preset in advance of any actual camera shot being taken.

Where the equipment so far described is desired to be employed for the production of motion picture films where several cameras viewing a scene are electronically or electrically controlled from one control position, then the control potentials for the lighting arrangement of Figure 2 would be derived from this control position which would take the place of the vision mixer arrangement of Figure 1.

It will of course be understood that the combination of four cameras controlling six lighting sources has been given solely by way of example and that the arrangement according to this invention may be applied to any desired number of cameras in combination with any desired number of lighting sources. It will also be apparent that only some of the lighting sources in a studio need be connected to be controlled according to this invention and that others of the studio lighting sources can be controlled by ordinary switches or faders according to known techniques.

Figure 3 is a circuit diagram of a more complex arrangement according to the invention which, in the form illustrated, may be used to enable control voltages such as are derived from terminals E1 to E4 of Figure 1 to operate a series of six lighting sources controlled by magnetic amplifiers such as is shown in Figure 2. The switching arrangement shown in Figure 3 may be substituted for the part of Figure 2 which is shown within the broken line rectangle D. The switching arrangement, which would be controlled by a lighting operator, basically consists of six rows of control units, four in a row, the rows being referenced CU11 to CU14, CU21 to CU24, CU31 to CU34, CU41 to CU44, CU51 to CU54 and CU61 to CU64 respectively, and one of the control units in each row being connected to each of the conductors C1 to C4 supplied from terminals E1 to E4. In order to simplify the drawing only the control units CU11 to CU14 have been shown in detail but it will be understood that the remaining control units are constructed in a similar manner. It should also be explained that, as shown, the control units are designed to operate with a varying positive D.C. bias voltage from terminals E1 to E4 instead of the negative varying voltage employed in Figure 2. This variable positive D.C. voltage may readily be obtained, for example by applying a positive bias to the cathodes of the valves V1 to V4, derived via faders A and B, instead of applying a negative bias to the grids, as shown in Figure 1. It will be understood that the control units may equally operate from negative voltages if desired, with minor changes in the circuitry.

Each control unit consists of a control member CM in the form of a manually adjustable potentiometer which may be similar to the faders at present employed for the control of lighting equipment. Associated with each control member CM are switches SW1 and SW2 which are arranged to be open when the fader is in the "off" position (i.e. with the moving contact at the lower end of the track in Figure 3), but which are closed as soon as the moving contact of the potentiometer is moved from its end position to bring the potentiometer CM into operation. When closed the switch SW1 connects the potentiometer CM to the associated one of the conductors, C1 to C4 whilst the switch SW2 illuminates a green lamp GL via a relay contact A2, from battery B, to indicate that the fader has been adjusted to some position other than its "off" position. The potentiometer is initially held in any such adjusted position by a mechanical lock, as will be explained hereafter with reference to Figures 4a and 4b. If desired the circuit can be arranged so that the brightness of lamp GL varies with the position of the fader. Now, when a positive D. C. control voltage is fed via the associated one of the conductors C1 to C4 this voltage is applied through SW1 and the track of potentiometer CM to light the red lamp RL and energise relay A, the latter being capable of being energized by only a small D.C. bias voltage applied thereto and yet not overloading when the full D.C. voltage is applied from the associated conductor. The energisation of relay A opens contact A2 to extinguish green lamp GL and closes contact A1 to energize solenoid S which operates to hold the fader in the desired position electromagnetically and to release the mechanical locks as will be hereinafter described with reference to Figures 4a and 4b. The brightness of lamp RL will be proportionate to the incoming voltage and this lamp indicates that the particular fader is in operation, since a D.C. bias voltage is being fed from the appropriate channel of the vision mixer. Alternatively the lamp RL can be inserted in series with rectifier X or in a position where its brightness does not vary with the applied D.C. control voltage, or again in a position where its brightness is an indication of the current in the associated lamp. The rectifier X ensures that a positive control voltage fed to any magnetic amplifier via one of the control units connected to the input of that amplifier, cannot be fed back through another control unit.

With the arrangement described it will thus be seen that it is possible to preset the intensity of any of the lamps L1 to L6, independently of the control which is exerted through the faders A and B in the vision mixer of Figure 1, by variation of the appropriate potentiometers CM in the control units CU. Thus if it is desired that light source L1, for example should only be at half brilliance when camera 1 is in operation and a maximum video signal is being obtained from its output; even when the fader A or B controlling that television camera is brought to its maximum position, this light source will only come up to half of its maximum brightness by virtue of the setting of the potentiometer CM in the control unit in use.

As will be hereinafter explained with reference to Figures 4a and 4b the mechanical interlock on the potentiometers CM and the solenoid S are so arranged that, when the solenoid S is de-energised, the potentiometer is returned to its "off" position and is ready to be set to another value for another lighting effect in conjunction with a later shot from the same camera or a shot from any other camera.

Referring now to Figures 4a and 4b there is shown somewhat diagrammatically one construction of potentiometer CM that may be employed in the control units of Figure 3, together with some of the other components of a control unit CU.

The device consists of an arm 1 mounted on a shaft 2 by a flexible rubber mounting 3 and carrying the moving contact 4 of a potentiometer which also includes an arcuate resistance tract 5 engaged by the contact 4, the arrangement being such that movement of the arm 1 moves the slider 4 over the potentiometer track 5. The electrical connections to the slider 4 and track 5 are omitted for the sake of clarity. The arm 1 is provided with a roller 6 slidable on a shaft 7 extending in the direction of arm 1 and surrounded by a compression spring 8 which tends to urge the roller 6 upwards as viewed in the drawings. However the roller 6 is normally held under a guiding surface 9a of a guide 9 located adjacent the arm 1, to engage with detents 10. Thus, upon moving the arm 1 in the direction of arrow O, by manipulating the control knob 11, to adjust the fader to a desired position the roller moves over the guide 9 and is held in the desired position by the roller engaging in one of the detents 10. This rotation of the arm takes place against a constant torque spring 12, associated with the shaft 2, which tends to return the arm 1 in the opposite direction to the arrow O. At the same time as the arm 1 is moved from its "off" position indicated in broken lines in Figure 4a the operating member of switches SW1 and SW2, which are engaged by the arm in the "off" position, are released allowing these switches to close. The operation is then as described with reference to Figure 3. The solenoid S is located opposite an extension plate 13 of magnetic material on the arm 1, below the shaft and when the solenoid S is energised it attracts the plate 13, so rocking the arm 1 about the shaft 2 in its rubber mounting 3 whereby the solenoid acts both to hold the arm 1, and hence the slider 5 of the potentiometer in the adjusted position, and also releases roller 6 from the detent 10 in the guide 9 so that the spring 8 can urge it upwards to engage on the smooth edge 9a of the guide 9. Now, when the solenoid S is de-energised, the spring 12 operates to return the arm 1 to its "off" position, where the roller 6 rolls or slides along guiding edge 9a until it moves under the upturned portion 9b of the guide 9a adjacent the "off" position so that on the next movement of the fader to an adjusted position it will again engage with the detents 10 on the guide 9. When the fader returns to the "off" position switches SW1 and SW2 are again opened and any following control voltage will not be passed to operate the lamp controlled by the fader unless it has been preset to some position.

It will thus be seen that the arrangement according to the present invention provides means whereby it is possible to obtain the optimum lighting effect on a scene for each camera position and that this effect can be brought into operation automatically as desired at the same time as the camera is brought into operation, whereby neither time nor space is desired to rearrange the lighting equipment. Furthermore the lighting operator can, during the course of a television programme or the shooting of a film sequence, preset the lighting conditions required for a certain period ahead of that in which those lighting sequences are brought into operation.

If it is desired to preset a whole sequence of lighting effects throughout a particular television program or filming operation, then the necessary information for operating the control units for the lighting sources may be stored by a memory system, such as a punched tape or a magnetic tape, which can be arranged to move automatically as successive shots are taken by the cameras and preset the lighting conditions for the next shot.

It will be understood that various modifications may be made without departing from the scope of this invention. Thus numerous other constructions of manual fader control for the lighting sources may be produced besides that particularly described with reference to Figures 4a and 4b. It will also be understood that the invention may also be employed for other purposes, besides television and motion picture film applications, where it is desired to change lighting effects in synchronism with the operation of other equipment or apparatus. Moreover, it will be understood that instead of the faders controlling individual light sources directly as hereinbefore described, the faders may be employed to control one or more electric motors or the like which in turn each control one or more light adjusting devices to regulate the output from the lighting sources.

We claim:

1. Apparatus comprising a plurality of cameras for producing output information of the same scene from different view points, means for initiating a control signal for selecting a desired output from amongst said cameras, means for producing a plurality of different lighting effects on said scene and means including a control device operated by said control signal for selectively bringing any one of the chosen lighting effects into operation as the output from a particular camera is selected.

2. Apparatus as claimed in claim 1 in which the different lighting effects each consist of plural different light sources.

3. Apparatus as claimed in claim 2, in which one or more of the light sources form a part of more than one lighting effect.

4. Apparatus for the production of television signals comprising at least two television cameras producing output information of a common scene from different viewpoints, at least two different lighting effects for lighting said scene, a vision mixer which selects the outputs from the various cameras and which produces a control signal for controlling said cameras and means for feeding said control signal also to a control device for controlling said lighting effects so that when the vision mixer is operated to select the output from a chosen camera, the desired lighting effect associated with that camera is automatically brought into operation.

5. Apparatus as claimed in claim 4 wherein the vision mixer includes means for producing a D.C. bias which controls the gain of an amplifier through which the video signals from the output of a selected camera are passed and the D.C. bias variations which vary the camera signals are also employed to operate a control member controlling the current applied to the associated lighting source or sources.

6. Apparatus as claimed in claim 5, in which the control member comprises a magnetic amplifier.

7. Apparatus as claimed in claim 6, comprising a magnetic amplifier incorporating positive or negative feedback.

8. Apparatus comprising a plurality of cameras for producing information of a common scene from different viewpoints, means initiating a control potential for selecting a desired output from amongst said cameras, means for producing a plurality of different lighting effects on said scene and means including a control device operated by said control potential for controlling said lighting effects so that any chosen lighting effect is brought into operation as the output from a particular camera is selected.

9. Apparatus as claimed in claim 8, in which said control device comprises a magnetic amplifier.

10. Apparatus as claimed in claim 8, in which said control device comprises a saturable reactor.

11. Apparatus comprising a plurality of cameras for producing information of a common scene from different viewpoints, means initiating a control potential for selecting a desired output from amongst said cameras, a plurality of light sources for producing a plurality of different lighting effects on said scene, means including a control device operated by said control potential for controlling said light sources so that any chosen lighting effect is brought into operation as the output from a particular camera is selected, and at least one fader connected to each light source which can be preset to a level to produce the desired maximum intensity of light from any one light source.

12. Apparatus as claimed in claim 11, including means indicating when a fader is preset to a given value and means indicating when the lighting source it controls is in operation.

13. Apparatus comprising a plurality of cameras for producing information of a common scene from different viewpoints, means initiating a control potential for selecting a desired output from amongst said cameras, a plurality of light sources for producing a plurality of different lighting effects on said scene, means including a control device operated by said control potential for controlling said light sources so that any chosen lighting effect is brought into operation as the output from a particular camera is selected, at least one fader connected to each light source which can be preset to a level to produce the desired maximum intensity of light from any one light source, means for mechanically locking said faders at any desired preset value and an electromagnetic control which overrides said mechanical lock and operates to restore the fader to its rest position.

14. Apparatus comprising a plurality of light-sensitive means for producing information of a common scene from different view points, means initiating a control signal for selecting a desired output from amongst said light-sensitive means, a plurality of different lighting effects for illuminating said scene in a number of different ways and means including a control device operated by said control signal for controlling said lighting effects so that any chosen lighting effect is brought into operation as the output from a particular light-sensitive means is selected.

References Cited in the file of this patent

UNITED STATES PATENTS

| | | |
|---|---|---|
| 2,164,297 | Bedford | June 27, 1939 |
| 2,659,038 | Heyer | Nov. 10, 1953 |

FOREIGN PATENTS

| | | |
|---|---|---|
| 377,363 | Great Britain | July 28, 1932 |